United States Patent
Weelden et al.

(10) Patent No.: US 6,622,967 B2
(45) Date of Patent: Sep. 23, 2003

(54) AERODYNAMIC CONTROL FOR SEPARATION OF UNSTABLE BODIES

(75) Inventors: Scott Van Weelden, Lancaster, CA (US); Axel Sehic, Canyon County, CA (US); Kevin Kelly, Lancaster, CA (US); Tom Pugh, Tehachapi, CA (US); Steve Ericson, Lancaster, CA (US)

(73) Assignee: Lockheed Martin Corporation, Bethesda, MD (US)

(*) Notice: Subject to any disclaimer, the term of this patent is extended or adjusted under 35 U.S.C. 154(b) by 2 days.

(21) Appl. No.: 10/041,042

(22) Filed: Jan. 9, 2002

(65) Prior Publication Data

US 2003/0127564 A1 Jul. 10, 2003

(51) Int. Cl.[7] ............... B64D 1/00; B64D 1/12; B64D 1/02
(52) U.S. Cl. ............... 244/137.4; 244/137.1; 89/1.58; 89/1.57; 89/1.51; 89/1.54
(58) Field of Search .............. 244/137.4, 137.1; 89/1.54, 1.51, 1.57, 1.58, 2

(56) References Cited

U.S. PATENT DOCUMENTS

| | | | |
|---|---|---|---|
| 2,845,002 A | * 7/1958 | Ackerman, Jr. et al. | 89/1.14 |
| 3,397,432 A | * 8/1968 | Banas | |
| 3,942,749 A | * 3/1976 | Hasquenoph et al. | 244/137.4 |
| 4,031,805 A | * 6/1977 | Puttinger et al. | 89/1.58 |
| 4,170,923 A | * 10/1979 | Kilmer | 89/1.819 |
| 4,347,777 A | * 9/1982 | Jakubowski et al. | 244/137.4 |
| 4,616,793 A | * 10/1986 | Hassler, Jr. | 89/1.54 |
| 4,917,526 A | * 4/1990 | Paterson | 89/1.57 |
| 5,168,119 A | * 12/1992 | Sands | 89/1.816 |
| 5,231,928 A | 8/1993 | Phillips et al. | |
| 5,487,322 A | 1/1996 | Rhodes | |
| 5,520,476 A | 5/1996 | Marks et al. | |
| 5,810,287 A | * 9/1998 | O'Boyle et al. | 244/137.4 |
| 5,904,323 A | * 5/1999 | Jakubowski et al. | 244/137.4 |
| 5,961,075 A | * 10/1999 | Russell, III | 89/1.51 |
| 6,119,982 A | * 9/2000 | Jakubowski et al. | 244/137.4 |
| 6,290,182 B1 | * 9/2001 | Grunditz | |
| 6,460,445 B1 | * 10/2002 | Young et al. | 89/1.51 |

FOREIGN PATENT DOCUMENTS

GB     2071286     * 9/1981   ............... 244/137.4

* cited by examiner

Primary Examiner—Michael J. Carone
Assistant Examiner—L. Semunegus

(57) ABSTRACT

Apparatus for separating aerodynamic objects from an aerodynamic vehicle includes a first element, aerodynamically configured to create nose-down pitching moment, mounted to the object surface, a second element mounted to the first element and projecting into an oncoming airstream such that when enabled, the passing air tears the apparatus from the surface which otherwise supports it. The first element is a body designed to be conformal with the object surface to which it is mounted, and includes a forward end projecting into the oncoming airstream and a rearward end, and is secured to said object surface at the rearward end thereof. A flexible gasket is interposed between the first element and the object surface. The second element comprises a forward end directed toward the oncoming airstream and a rearward end, with the second element being mounted to the first element at the rearward end of the second element.

16 Claims, 2 Drawing Sheets

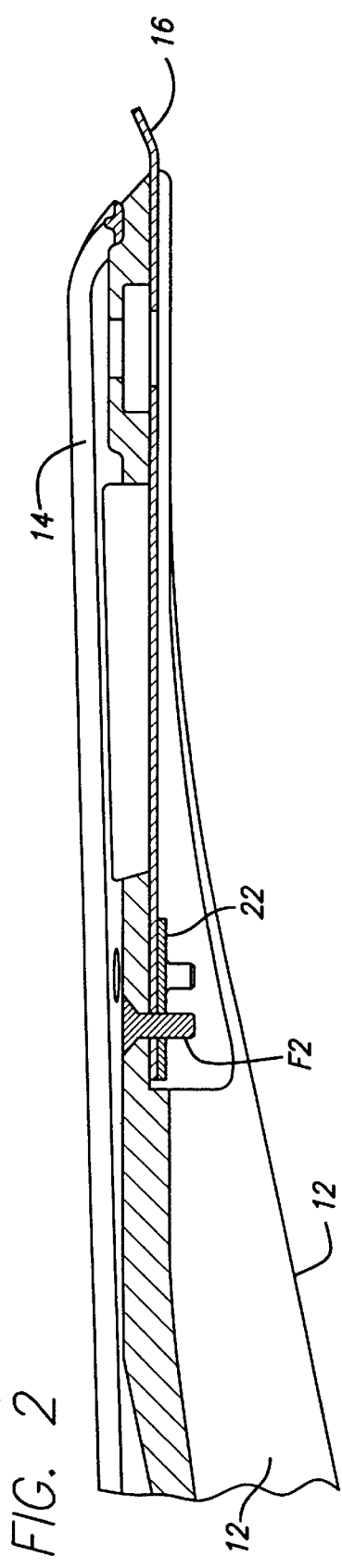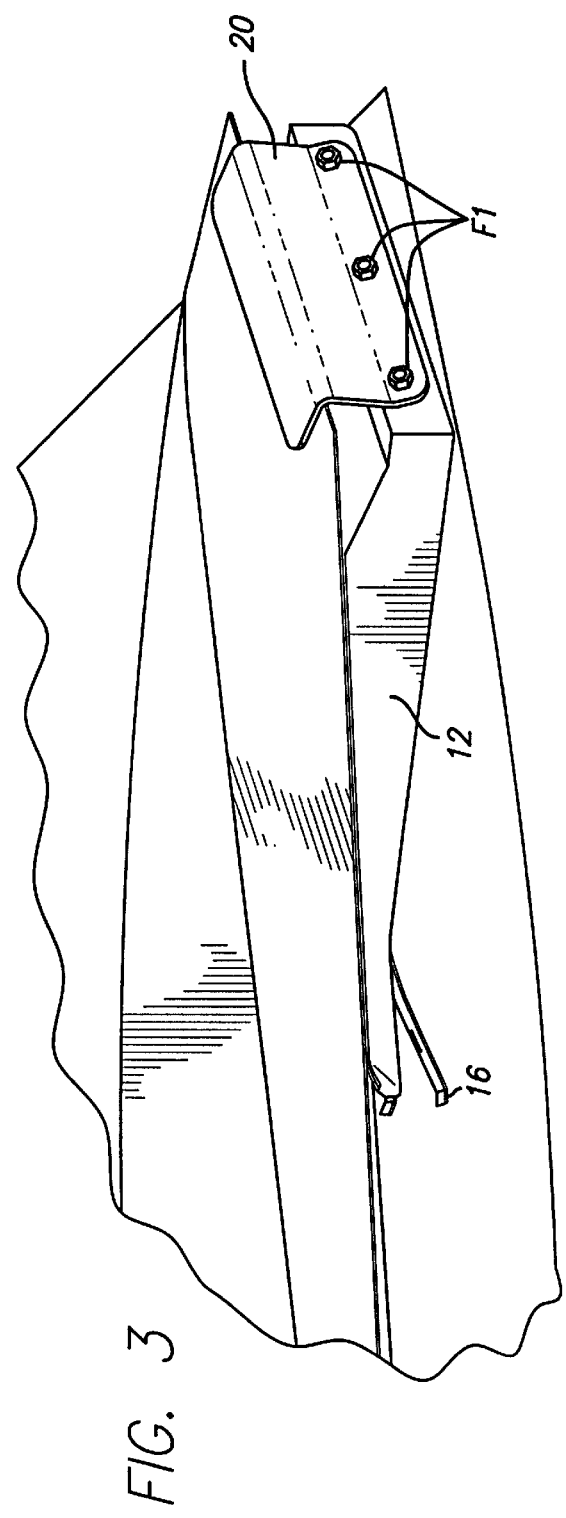

AERODYNAMIC CONTROL FOR SEPARATION OF UNSTABLE BODIES

BACKGROUND OF THE INVENTION

1. Field of the Invention

The present invention relates to devices for effecting separation of payloads from aircraft surfaces, and more particularly to apparatus facilitating passive separation of munitions, stores and other payloads from aircraft.

2. Description of the Related Art

One of the more difficult problems in the design of aircraft structures is the safe jettison of munitions, fuel tanks and other aerodynamic objects from aircraft structures. Without active power and control, the safe separation of such objects is subject solely to aerodynamic effects. As munitions are fielded on different aircraft, it becomes increasingly difficult to find a low-cost method of ensuring safe separation of the objects from the various platforms on which they are carried.

Different techniques have been attempted in the past, including the use of systems actuated by explosives, or by mechanical and electrical actuators. For example, U.S. Pat. No. 5,520,476 to Marks et al discloses an explosively actuated device, U.S. Pat. No. 5,487,322 to Rhodes discloses an electronically actuated hydraulic ram used to eject a store, and U.S. Pat. No. 5,231,928 discloses a gas generator for ejecting a store from an aircraft.

There is therefore an ongoing long felt need for an ejection apparatus, which will permit safe separation of a munition fuel tank or other payload from an aircraft during flight.

When designing such systems, several constraints must be taken into account. First, the system must fit within the envelope constraints of the launch vehicle, for while external carriage does not typically cause difficulty, more serious volumetric concerns arise when considering internal carriage. Second, the system must function without power or active control so that it is completely passive. Further, in the complex and convoluted flow fields surrounding most modern aircraft, passive devices must be robust over a wide range of angles of attack, sideslip and roll. Finally, the system must be simple and reliable to be inexpensive.

This usually means fewer parts coupled with quick assembly.

The present invention provides a solution to the aforesaid requirements.

SUMMARY OF THE INVENTION

In one aspect of the present invention, an apparatus for safely separating an aerodynamic object from an aircraft includes an aerodynamically contoured body secured to a surface of the object and a preloaded leaf spring, which protrudes into the air passing the object allowing the onrushing air to pull the aerodynamically contoured body off the object surface when enabled.

In another aspect of the present invention, the apparatus for separating the object from the aircraft further includes an aerodynamic pressure seal and mounting apparatus for securing the aerodynamically contoured body to the object surface.

These and other aspects, advantages and features of the invention will become more apparent, as will equivalent structures, which are intended to be covered herein, with the teaching of the principles of the invention in connection with the disclosure of the preferred embodiments thereof in the specification, claims and drawings in which:

BRIEF DESCRIPTION OF THE DRAWINGS

FIG. 2 is a cross-section of the apparatus of the invention mounted to an aircraft surface; and FIG. 3 shows the apparatus of the invention mounted on a vehicle flight surface.

DETAILED DESCRIPTION OF THE INVENTION

Figure 1:
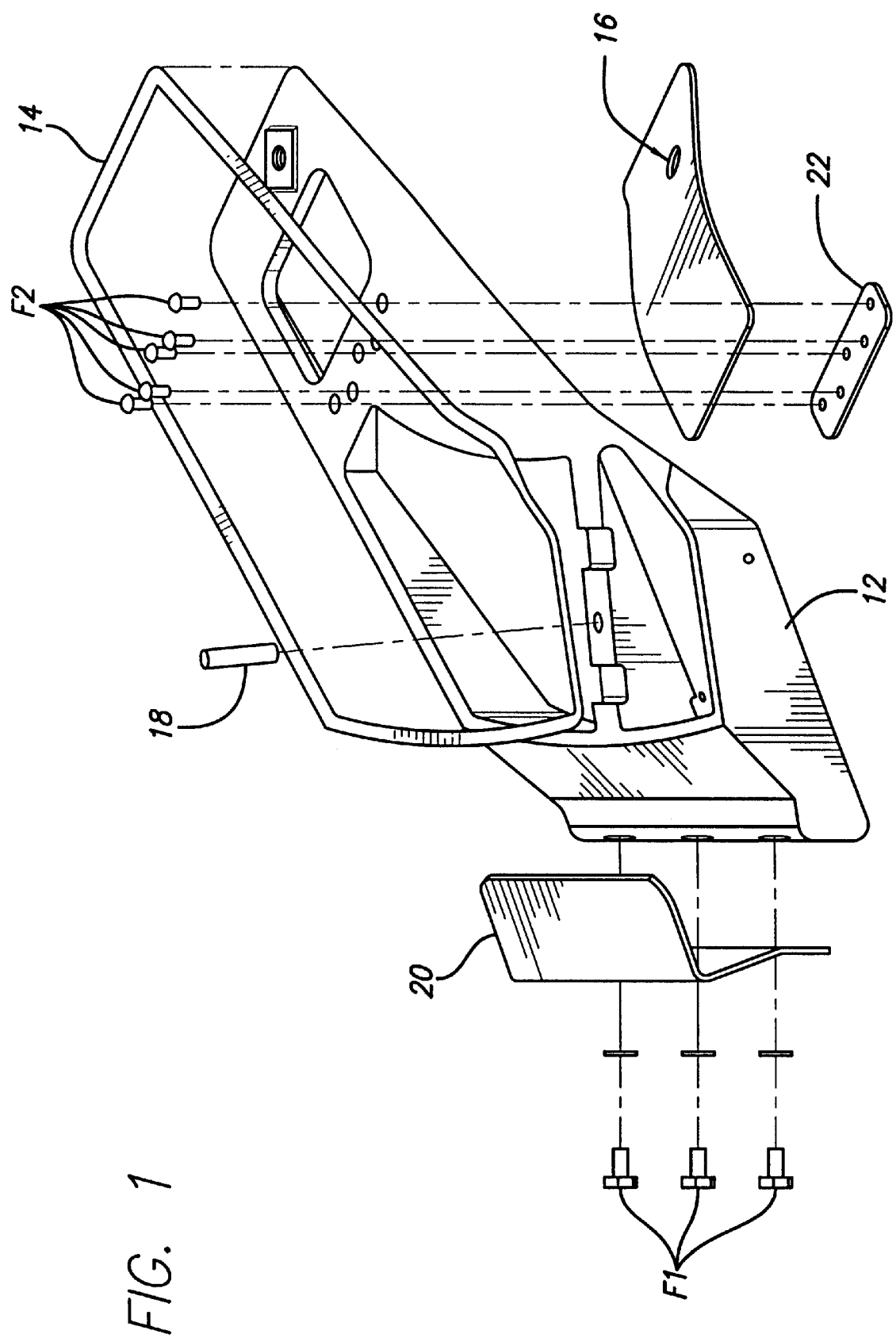
FIG. 1 shows generally, in perspective exploded view, the apparatus of the present invention.

The following description is provided to enable any person skilled in the art to make and use the invention and sets forth the best modes contemplated by the inventor of carrying out this invention. Various modifications, however, will remain readily apparent to those skilled in the art, since the generic principles of the present invention have been defined herein specifically to provide an apparatus for effecting safe separation of munitions from a carrier or supporting structure.

Referring now to the Figures of the drawing, the apparatus 10 of the invention is shown to include a wedge body 12, a seal 14, a wedge spring 16, a shear pin 18, a wedge clip 20, and a resilient spring doubler plate 22.

The wedge body 12 comprises a molded composite element formed to a specific aerodynamic shape, and has one surface designed to be roughly conformal to the outer mold line (OML) of the mounting surface (e.g., a flight surface or the outer mold line of the aerodynamic object), and another, albeit flat, opposing surface that forms an aerodynamic pressure surface. The wedge body 12 is hollowed out for weight reduction and includes drain holes for moisture elimination. A passageway leads from the flat surface to the inner hollows of the wedge body 12.

The seal 14 comprises a flexible gasket designed to provide an aerodynamic pressure seal when the wedge body 12 is mounted to the mounting surface.

The wedge spring 16 is a preloaded leaf spring. In its stored position it is held flush to the wedge body 12 via shear pin 18. In its deployed position, the spring protrudes out into the oncoming airstream and reveals said passageway, providing an aerodynamic moment such that the onrushing air pulls the wedge body 12 off the supporting aerodynamic surface.

The shear pin 18 secures the wedge body 12 to the aerodynamic surface to which the wedge body 12 is mounted, and provides a shear load path from the wedge body 12 into the mounting surface.

The wedge clip 20 attaches the rear or aft end of the wedge body 12 to the mounting surface via a set of fasteners F1 thereby providing a vertical load path.

The doubler plate 22 is positioned at the rearward end portion of the wedge spring 16 and is secured atop the wedge spring 16 via a second set of fasteners F2 thereby sandwiching the wedge spring 16 between the doubler plate 22 and the vehicle surface to which the wedge spring 16 has been secured.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

We claim:

1. An apparatus for separating an object from a supporting surface of an aerodynamic vehicle, comprising:
   a first element, said first element being aerodynamically configured to create nose-down pitching moment, and
   a second element mounted to the first element and projecting into the oncoming airstream, said second element comprising a pre-loaded spring.

2. The apparatus of claim 1, wherein a portion of said first element is further conformal with the vehicle when said first element is mounted to the vehicle.

3. The apparatus of claim 1, wherein said first element has a forward end projecting into the oncoming airstream and a rearward end, and wherein the rearward end of said first element can be secured to the aerodynamic vehicle.

4. The apparatus of claim 1, and further including a flexible gasket interposed between the first element and the object surface.

5. The apparatus of claim 1, wherein said second element comprises a forward end directed toward the oncoming airstream and a rearward end, said second element being mounted to said first element at the rearward end of said second element.

6. The apparatus of claim 5, wherein the object is a munition.

7. The apparatus of claim 1, wherein the object is a munition.

8. The apparatus of claim 1, wherein the object is a fuel tank.

9. An apparatus for separating an external store from a supporting surface of an aerodynamic vehicle, comprising:
   a first element mountable to the vehicle surface, said first element being aerodynamically configured to create nose-down pitching moment, and
   a second element mounted to the first element and projecting into the oncoming airstream, said second element comprising a pre-loaded spring.

10. The apparatus of claim 9, wherein a portion of said first element is further conformal with the vehicle surface when the first element is mounted to the vehicle surface.

11. The apparatus of claim 9, wherein said first element comprises a forward end projecting into the oncoming airstream and a rearward end, and wherein the rearward end of said first element is mountable to said vehicle surface.

12. The apparatus of claim 9, further comprising a flexible gasket interposed between the first element and the vehicle surface.

13. The apparatus of claim 9, wherein said second element comprises a forward end directed toward the oncoming airstream and a rearward end, said second element being mounted to said first element at the rearward end of said second element.

14. The apparatus of claim 13 wherein the store comprises a munition.

15. The apparatus of claim 9, wherein the store comprises a munition.

16. The apparatus of claim 9, wherein the store comprises a fuel tank.

* * * * *

UNITED STATES PATENT AND TRADEMARK OFFICE
CERTIFICATE OF CORRECTION

PATENT NO. : 6,622,967 B2
DATED : September 23, 2003
INVENTOR(S) : Scott Van Weelden et al.

It is certified that error appears in the above-identified patent and that said Letters Patent is hereby corrected as shown below:

Column 1,
Line 28, insert after "aircraft." -- None of the known devices assures safe separation of the aerodynamic objects from an aircraft during its flight. --
Line 32, after "munition" insert -- , --

Signed and Sealed this

Twenty-seventh Day of January, 2004

JON W. DUDAS
*Acting Director of the United States Patent and Trademark Office*